United States Patent [19]

Wynn-Smith

[11] 4,074,309
[45] Feb. 14, 1978

[54] VIDEO EFFECTS APPARATUS AND METHOD

[75] Inventor: David Wynn-Smith, Borehamwood, England

[73] Assignee: Chroma-Flex, Inc., West Nyack, N.Y.

[21] Appl. No.: 741,360

[22] Filed: Nov. 12, 1976

[51] Int. Cl.$^2$ ............................................. H04N 9/535
[52] U.S. Cl. ......................................... 358/82; 358/22
[58] Field of Search ...................... 358/22, 81, 82, 29, 358/40, 80

[56] References Cited

U.S. PATENT DOCUMENTS 2,845,482  7/1958  King et al. ...................... 358/29 X

FOREIGN PATENT DOCUMENTS 933,938  8/1963  United Kingdom .................. 358/22
1,293,847  10/1972  United Kingdom .................. 358/22

Primary Examiner—Robert L. Richardson
Attorney, Agent, or Firm—Alan K. Roberts

[57] ABSTRACT

The red, green and blue video output of a camera, telecine channel or video tape recording is fed into a video effects unit including red, green and blue circuits, each of which are the same. Each of these color circuits includes an emitter follower feeding into a paraphase amplifier which produces inverted and non-inverted signals which are fed into an emitter follower arrangement, across which is coupled a potentiometer having a tap feeding into an amplitude mixer. Also feeding into the amplitude mixer are signals derived from an audio circuit, signals derived from a blanking circuit and signals derived from a luminance circuit. These four signals or selected of these signals are amplitude mixed and fed into a further emitter follower arrangement and thence to a buffer amplifier, whereat a clamping circuit exerts a clamping action based on clamping pulses generated from a synchronization or composite video signal. The method of the invention relates to producing special video effects by the use of color video signals and supplemental television signals and more precisely involves forming the video signals into inverted and non-inverted signals and selecting a level between the inverted and non-inverted signals for amplitude mixing with further signals derived from other signals incidental to the color video signals.

29 Claims, 6 Drawing Figures

VIDEO EFFECTS APPARATUS AND METHOD

FIELD OF THE INVENTION

The invention relates to apparatus and methods for generating television color signals and more particularly to the generation of video effects in such a manner as to increase color range and improve the limits of television cameras, telecine channels and video tape recordings.

BACKGROUND OF THE INVENTION

The generation of color television signals by means of television pick-up cameras, telecine channels and video tape recordings is well known. The known techniques, however, have limits in color range and limits as to function. Thus, for example, with known apparatus and methods, it is not possible to provide on-line increases in color range, nor is it, for example, possible to use negative stock on telecine channels to produce positive video. Furthermore, it is not possible to rematch telecine normal stock and video tape recordings for color casts, increasing saturation, decreasing saturation and reducing or removing highlights.

In addition, it is not possible with known apparatus and techniques to provide for pulsing video signals in automatic cooperation with audio signals, nor is it possible to provide day for night televising by which the sky can be inverted with no change being made in the foreground information. Furthermore, it is not known to be able to reduce in on-line manner the foreground in a video signal such that effective night scenes can be realized in daytime televising.

SUMMARY OF THE INVENTION

It is an object of the invention to provide improved video effects apparatus and methods.

It is another object of the invention to provide improved video effects apparatus and methods which greatly increase color range and widely improve the limits of television cameras, telecine channels and video tape recordings.

Yet, another object of the invention is to provide fully controllable negative video signals with the ability to move from positive video signals to negative video signals or vice versa on any and all of the associated video channels.

It is yet a further object of the invention to provide for using negative stock on telecine channels and producing a positive video scene which can be matched at will.

Still a further object of the invention is to provide for rematching at will telecine normal stock and video tape recordings after decoding for color casts, increasing and decreasing saturation and reducing or removing highlights.

Still a further object of the invention is to provide video signals which are pulsed by concomitant audio signals and to provide for day and night televising wherein, for example, the sky is inverted without change being made to foreground information.

Other objects of the invention relate to reducing the foreground in video signals, such that effective night scenes can be realized in daytime televising.

In achieving the above and other of the objects of the invention, there is provided a video effects apparatus for use with a source of red, green and blue video signals and of supplemental television signals. This apparatus comprises paraphase amplifier means for receiving at least one of said video signals and deriving positive and negative signals therefrom, potentiometer means coupled to said paraphase amplifier means and including separate terminals respectively receiving said positive and negative signals and a tap adjustable between said terminals, mixing means coupled to said tap to receive a tapped signal from said paraphase amplifying means and further means deriving a signal from at least one of said supplemental television signals and transmitting the thusly derived signal to said mixing means, said mixing means amplitude mixing said tapped and derived signals to generate a video effects color signal.

According to a feature of the invention, a clamping pulse generating means is provided for generating clamping pulses and clamping means are provided which are responsive to said clamping pulses for clamping the video effects color signal.

According to another feature of the invention, there is provided a source of audio signals and means to derive an audio control signal from said audio signals and apply the audio control signals to said mixing means, said mixing means further amplitude mixing the audio control signal with said tapped and derived signals.

Yet a further feature of the invention, involves the provision of further potentiometer means which couples said further means to said mixing means and controllably adjusts the aforesaid derived signal.

In further accordance with the invention, emitter follower means are provided between the paraphase amplifier means and said potentiometer means to isolate the same.

According to still a further feature of the invention, the aforesaid further means may be a source of audio signals whereby the one video signal is modified by a signal derived from the audio signals.

In accordance with a more specific view of the invention, further paraphase amplifiers are provided for the other two video signals with further potentiometers being coupled to said further paraphase amplifiers and including separate terminals coupled to said paraphase amplifiers and taps adjustable therebetween, further mixing means being provided which are coupled to the latter said taps and the aforesaid further means which derives a signal from said one supplemental signal for applying the thusly derived signal to said further mixing means.

The aforesaid clamping pulse generating means may comprise a receiving means for receiving pulses from said source of supplemental signals, differentiating means for differentiating said pulses to form pulses of opposite polarities and means to pass pulses of one of said polarities to constitute clamping pulses. The source may be the source of synchronization pulses or may be a source of composite video signals, in which event the receiving means includes a clipper coupled to said differentiating means for clipping pulses from said composite video signals.

The circuitry, according to the invention, may include emitter follower means coupled to and receiving the video effects color signal and a buffer amplifier coupled to said emitter follower means to amplify the video effects color signal to constitute an output signal.

In further accordance with the invention, the source of supplemental signals may be a source of blanking or synchronization signals, and the aforesaid further means may comprise an emitter follower for receiving the latter said signals, a paraphase amplifier coupled to said emitter follower for generating positive and negative signals, emitter follower means for transmitting said positive and negative signals, a potentiometer coupled across the latter said emitter follower means and including a tap, an amplifier coupled to said tap for amplifying the thusly tapped signal, and a splitting network for receiving the amplified signal and splitting the same into signals adapted to cooperate with said video signals and one of which is transmitted to said mixing means.

Adjustment means may be provided between said amplifier and splitting network to adjust the magnitude of the signals passing therebetween. The splitting network may also include adjustment means to adjust each of the signals formed therein.

According to another aspect of the invention, said source of signals may be a source of non-composite video signals and the circuitry may comprise means to receive the non-composite video signals, clamping means to clamp the same and produce a black level, means to adjust the black level and produce an adjusted black level control signal, a paraphase amplifier to produce positive and negative (inverted or non-inverted) black level control signals, a potentiometer across which the latter said signals are applied, and a splitting network coupled to said potentiometer for splitting the black level control signals into separate signals for respectively cooperating with the video signals in said mixing means.

Adjustment means may also be provided to receive the adjusted black level control signal and transmit the same to said paraphase amplifier. An emitter follower may be provided between said paraphase amplifier and the latter said potentiometer.

According to still another aspect of the invention, said means to derive an audio control signal may comprise a transformer for receiving said audio signals, an audio amplifier coupled to said transformer to amplify audio signals received therefrom, and a splitting network for splitting the thusly amplified signal to produce three signals, one of which is applied to said mixing means. A ground circuit may be provided which is adjustably coupled to said further potentiometer means.

According to other features of the invention, a manual control means may be provided for controlling the clamping of the video effects color signal, and there may be comprised, between the mixing means and the following emitter follower means, a diode and capacitor in parallel for the transmission of signals.

According to the method of the invention, there is produced special video effects by the use of color video signals and supplemental television signals, said method comprising forming at least one of said video signals into inverted and non-inverted signals, selecting a signal level between the inverted and non-inverted signals and amplitude mixing the thusly selected signal with a further signal derived from at least one of said supplemental signals to produce an output signal.

The above and other objects, features and advantages of the invention will be found in the detailed description which follows hereinafter.

BRIEF DESCRIPTION OF THE DRAWINGS

The invention will be more clearly understood with reference to the accompanying drawing in which.

DETAILED DESCRIPTION

Figure 1:
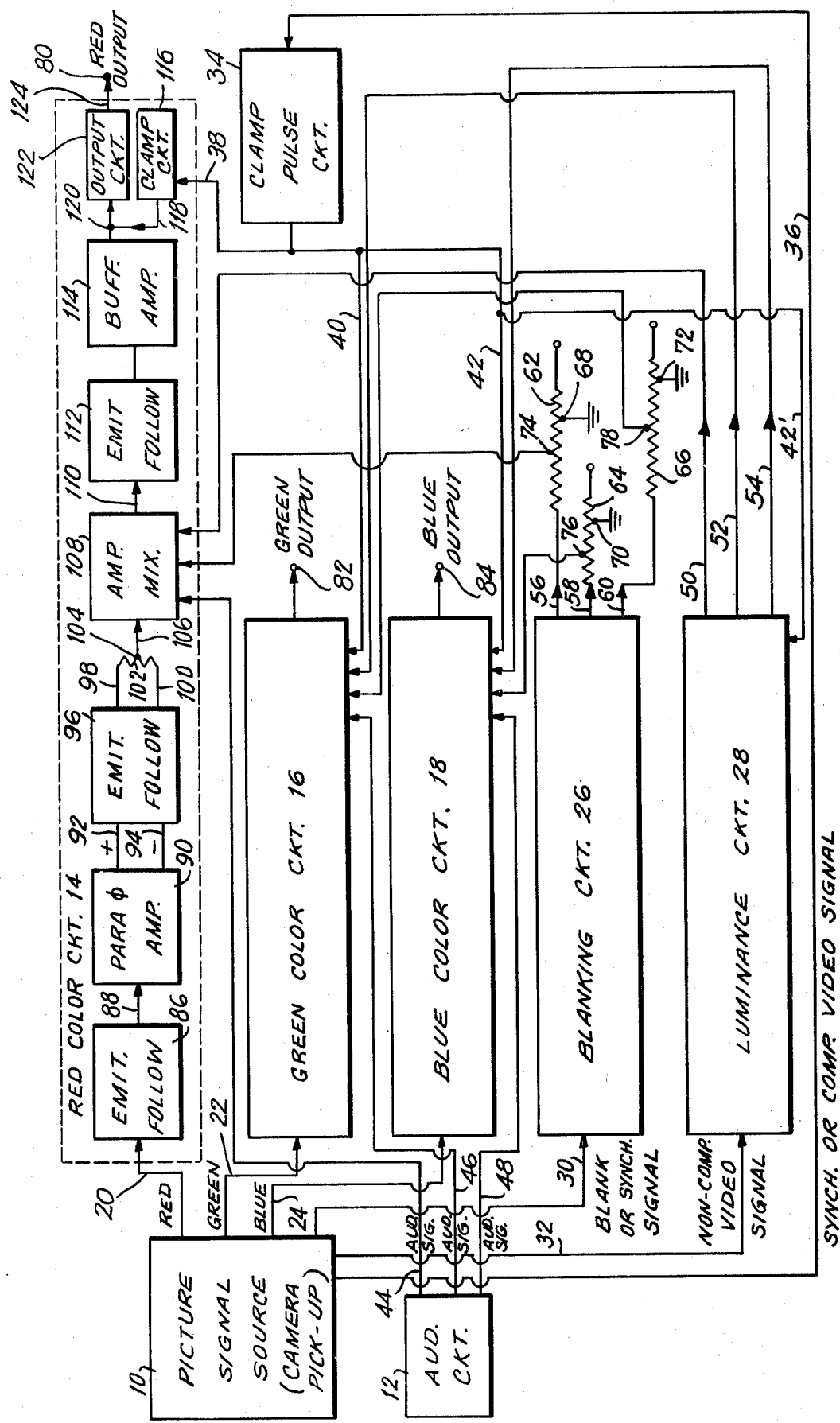
FIG. 1 is a block diagam of a circuit provided in accordance with the invention.

According to the invention, the red, green and blue video output signals of a television camera, telecine channel or the like are fed into the video effects unit of the invention. Each of these video output signals follows a similar path. More particularly, such a signal is fed into an emitter follower, thence into a paraphase amplifier and from the paraphase amplifier, which produces signals in inverted and non-inverted (in other words, positive and negative) forms, the signals are fed into two emitter followers which isolate the outputs of the paraphase amplifier. The isolated outputs are placed across a potentiometer, the slider of which can then give adjustably positive or negative video signals. The thusly adjusted signal is fed into the input of an amplitude mixing circuit.

A composite blanking signal, for example, from the camera or telecine channel passes through a similar path up to the potentiometer. The slider of such potentiometer feeds into a further amplifier stage and thence into an emitter follower. This emitter follower feeds three parallel potentiometers. The slider of the first of the potentiometers cooperates in the aforesaid mixing circuit. The other potentiometers supply signals which go into other mixing circuits as will be shown in greater detail hereinafter.

One of the input video signals constitutes an input into the luminance circuit employed in accordance with the invention. The luminance signal feeds into an emitter follower arrangement, the output of which is clamped by clamp pulses. The signal also goes into a "black level" control circuit which is clamped by clamp pulses.

The black level circuit can clip the luminance signal from black level to the top of the video signal, this black level circuit being very effective and stable. The luminance signal then goes into a paraphase amplifier whose two outputs go into an emitter follower arrangement which feeds across a potentiometer, the slider of which gives respectively more positive or negative luminance depending upon its position. The output from the potentiometer slider feeds into an amplifier stage, thence into an emitter follower stage and thereafter into three parallel potentiometers giving three inputs into the various amplitude mixing circuits as described hereinafter. The output of each mixing circuit goes into an emitter follower and thereat is clamped with clamp pulses. It then passes into a black level control circuit and finally passes into an output emitter follower.

The synchronization input on the video effects apparatus of the invention can be fed, for example, either with synchronization pulses or with composite video signals. Whatever signal is supplied is used to form clamp pulses of, for example, approximately 2 microseconds duration timed with reference to the front edge of, for example, the synchronization pulses. These clamp pulses are amplified and fed into an emitter follower circuit and are then fed to each of the color channels and to the luminance circuit.

The black level and clamping circuits of the invention are of special interest since the black level can be operated over an extremely wide range and is extremely stable.

The audio input of the video effects unit can be supplied with an audio signal at approximately zero level. It is held off with a transformer which feeds into an amplifying stage to provide a signal which is then split and fed to the three color channels. More particularly, the output of the related mixer is fed to a transistor into which the audio signal is fed for purposes of control.

With more particular reference to FIG. 1, there are seen therein a picture signal source which may be, for example, a television pick-up camera, a telecine channel or a video tape recording. The source is indicated generally at 10. There is also provided an audio circuit indicated generally at 12.

Three color circuits or channels are indicated at 14, 16 and 18 for red, green and blue, respectively. These receive color video signals from source 10 via lines 20, 22 and 24.

In addition, there are provided blanking circuit 26 and luminance circuit 28. The blanking circuit 26 is coupled to source 10 and receives therefrom a blanking or synchronization signal via line 30. Luminance circuit 28 is coupled to source 10 via line 32 from which it receives a non-composite video signal originating at source 10 or from some other suitable source.

Clamp pulse circuit 34 is a clamp pulse generator. It receives a synchronization or composite video signal via line 36 from source 10. Clamp pulse circuit 34 transmits its output to circuits 14, 16 and 18 via lines 38, 40 and 42.

The audio circuit 12 transmits its audio signals via lines 44, 46 and 48 to color circuits or channels 14, 16 and 18, respectively. Luminance circuit 28 transmits its output signals via lines 50, 52 and 54 to the color circuits 14, 16 and 18 for use in the amplitude mixing circuits therein.

The blanking circuit 26 feeds its outputs via lines 56, 58 and 60 into potentiometers 62, 64 and 66, each of which has variable ground taps 68, 70 and 72. The sliders of these potentiometers are indicated at 74, 76 and 78, these also feeding respectively into the various color circuits 14, 16 and 18.

Each of the color circuits is provided with its own respective output terminal 80, 82 or 84. Each of these channels is internally constructed in the same manner, such as indicated with greater particularity for red color circuit 14.

Red color circuit 14 includes an emitter follower 86 receiving its input signal from line 20 and transmitting the signal via line 88 to paraphase amplifier 90 having two output lines 92 and 94 for carrying the thusly generated inverted and non-inverted (positive or negative) output signals to emitter follower arrangement 96 consisting actually of two emitter followers which isolate the lines 92 and 94. Emitter follower arrangement 96 feeds its outputs via lines 98 and 100 to the opposite terminals of potentiometer 102, the slider or tap 104 of which feeds the thusly tapped signal via line 106 to amplitude mixer or mixing circuit 108. Therein are amplitude mixed the audio signal received via line 44, the blanking circuit signal received from slide 74 of potentiometer 62 and/or the luminance control signal received via line 50. The thusly mixed signal is transmitted via line 110 to emitter follower 112 which signal is thence fed to buffer amplifier 114. A clamping circuit 116 receives clamp pulses from circuit 34 via line 38 and applies a clamping pulse via line 118.

The clamp pulses received via line 118 may be applied at terminal 120 or may be applied to the buffer amplifier 114 or may be applied to the emitter follower 112. In any event, the clamped output is fed through output circuit 122 via line 124 to output terminal 80.

The procedure followed in red color circuit 14 is the procedure which is followed in green color circuit 16 and blue color circuit 18. Thus, three controlled video effects signals are generated at terminals 80, 82 and 84 and may thence be employed in conventional manner to form a color picture.

Figure 2:
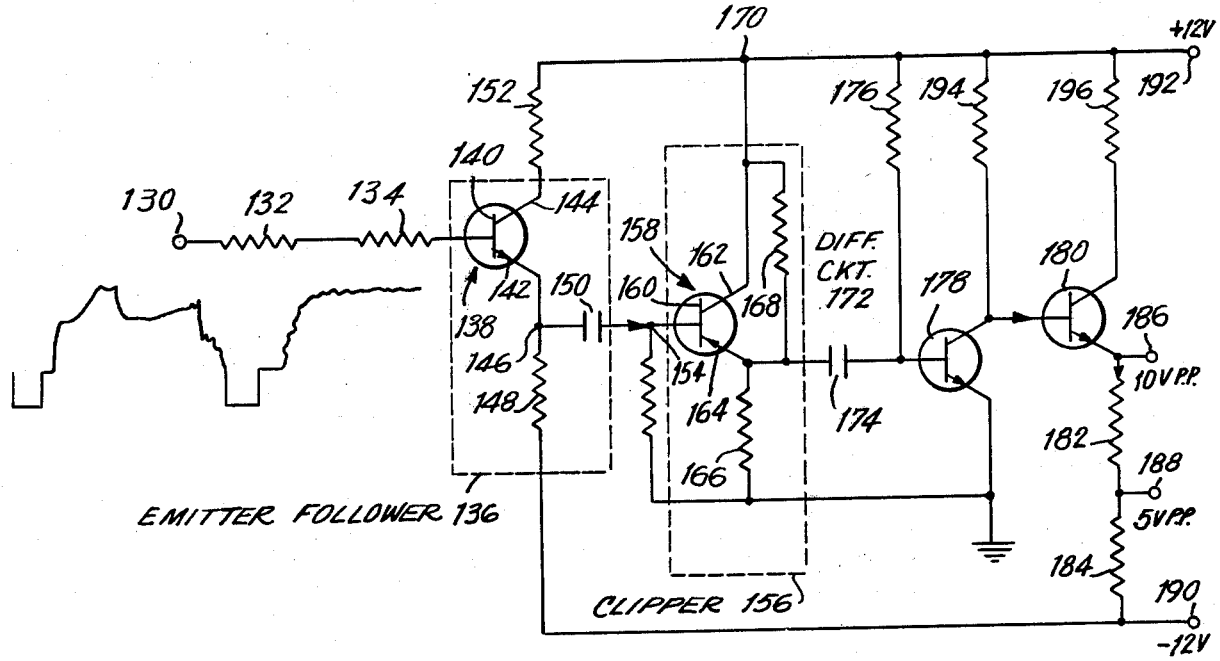
FIG. 2 is a schematic diagram of a clamp pulse generator utilized in the circuit of FIG. 1.

FIG. 2 illustrates the details of clamp pulse generator or circuit 34. Therein, it is seen that the circuit includes an input terminal 130 at which are applied the illustrated composite video signal or a synchronization signal. Terminal 130 is coupled via resistors 132 and 134 to emitter follower 136 which includes a transistor 138 having a base 140, emitter 142 and collector 144. The emitter 142 is connected to terminal 146 to which is connected resistor 148 and capacitor 150. The collector 144 is connected to resistor 152. The signal is fed via capacitor 150 through line 154 to a clipper 156. The clipper 156 is not necessary if synchronization pulses are being fed to terminal 130 but, if the input signal is a composite video signal, the clipper 156 is employed to clip pulses therefrom.

The clipper 156 includes a transistor 158 including a base 160, a collector 162 and an emitter 164. The emitter 164 is coupled to resistor 166 and the emitter is further coupled via resistor 168 to collector 162, as well as to terminal 170 coupled to the aforesaid resistor 152.

Signals pass from the clipper 156 via a differentiating circuit 172 which includes a capacitor 174 and a resistor 176. This differentiating circuit serves to differentiate the forward and trailing edges of the pulses to produce P and N pulses therefrom.

These P and N pulses pass through transistors 178 and 180 which serve to block out the negative pulses and pass only the positive pulses, which pass to a voltage divider consisting of resistors 182 and 184, and thence to output terminals 186 and 188 from which the outputs may be selectively chosen. A minus 12 volt level input is applied at terminal 190, whereas a positive 12 volt input is applied at terminal 192. This voltage is applied to transistors 178 and 180 via resistors 194 and 196.

Figure 3:
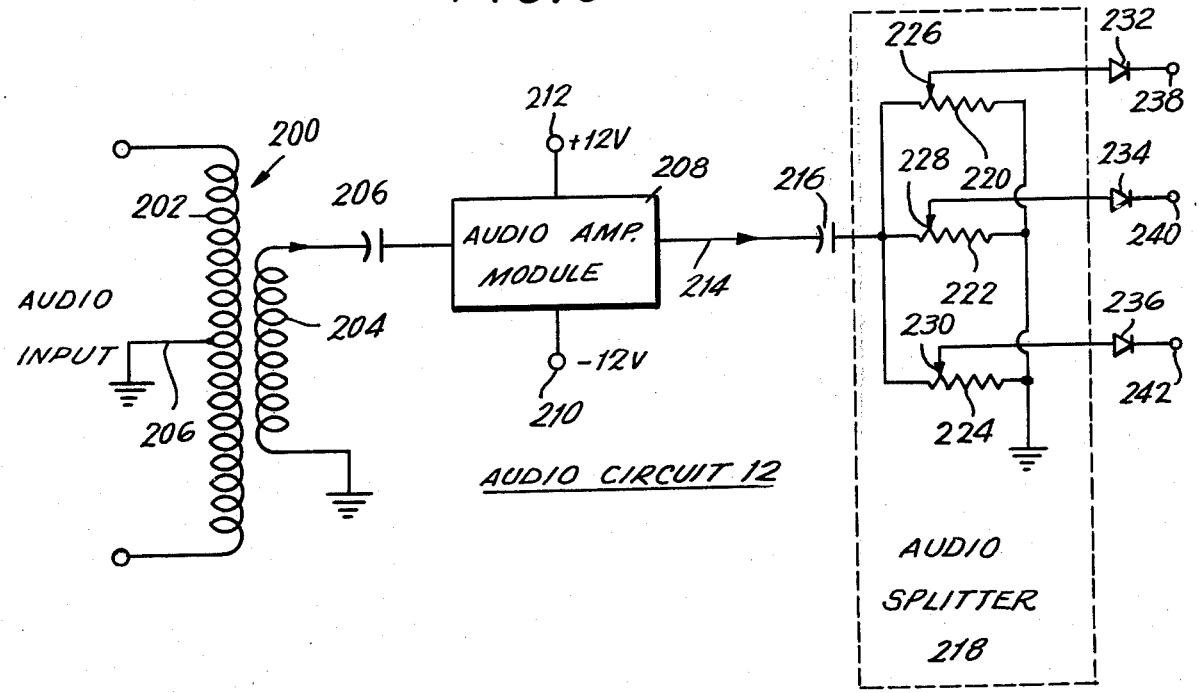
FIG. 3 is a schematic diagram of an audio circuit utilized in the circuitry of FIG. 1.

FIG. 3 illustrates the details of audio circuit 12 and more particularly shows a transformer 200 consisting of primary winding 202 and secondary winding 204. The primary 202 is center tapped and grounded at 206.

The output of secondary winding 204 passes via capacitor 206 to audio amplifier module 208 of conventional construction to which are applied a minus 12 volt potential and plus 12 volt potential via terminals 210 and 212 respectively. The output of the audio amplifier 208 passes via line 214 and capacitor 216 to the audio splitter 218 which includes three potentiometers 220, 222 and 224. These potentiometers have slides or taps 226, 228 and 230 which respectively feed diodes 232, 234 and 236, which feed signals to output terminals 238, 240 and 242. These output terminals are respectively coupled to lines 44, 46 and 48 as illustrated in FIG. 1. Thus, the purpose of the splitter is to provide individually controllable signals, which are fed to the amplitude mixers of the respective color circuits 14, 16 and 18.

Figure 4:
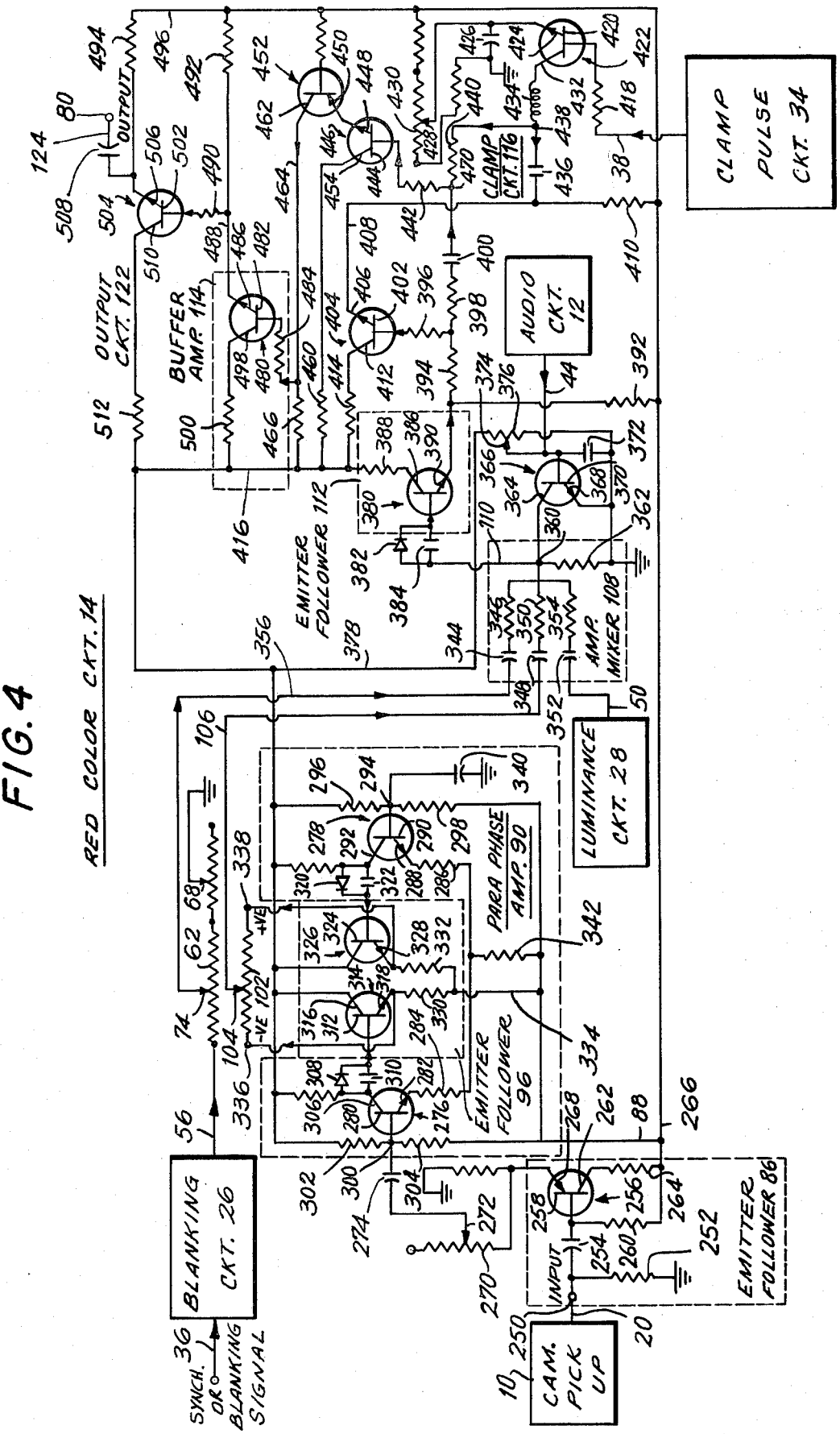
FIG. 4 is a schematic diagram of a color circuit employed in the circuitry of FIG. 1.

FIG. 4 illustrates the details of, for example, red color circuit 14, the details of green color circuit 16 and blue color circuit 18 being the same. The details of red color circuit 14 as shown in FIG. 4 are shown in association with external circuitry and apparatus including, for example, a camera pick-up 10, a blanking circuit 26, luminance circuit 28, audio circuit 12 and clamp pulse circuit 34. The red color circuit 14, as illustrated in FIG. 4, includes (as previously mentioned with respect to FIG. 1) emitter follower 86 coupled via line 88 to paraphase amplifier 90, in turn coupled to emitter follower 96 to which it supplies inverted and non-inverted (positive or negative) signals. The emitter follower 96 is coupled to the opposite extremities of potentiometer 102 whose tap or slider 104 is coupled via line 106 to amplitude mixer 108 receiving other inputs from the amplitude circuit 12, blanking circuit 26 and luminance circuit 28. The thusly formed signal is transmitted via line 110 to emitter follower 112 and thence to buffer amplifier 114 with the clamping pulse circuit 34 being capable of generating a clamping signal or pulse which is applied by clamp circuit 116 to the thusly generated signal. It will be appreciated that the manner in which the clamping pulses are applied is somewhat simplified in FIG. 1 with the details being given with greater particularity in FIG. 4. It will then be noted that the output signal is finally generated in output circuit 122, wherefrom it passes via line 124 to output terminal 80.

More particularly, it is seen in FIG. 4 that signal is passed from camera pick-up 10 via line 20 to input terminal 250 which is grounded via resistor 252, but which is connected via capacitor 254 to transistor 256 in the emitter follower 86. The transistor 256 includes the base 258 connected to capacitor 254 and resistor 260. The collector 262 of transistor 256 is connected via resistor 264 to line 266 connected in common with one terminal of resistor 260.

The emitter 268 of transistor 256 is connected to potentiometer 270, the tap 272 of which constitutes an adjustable means for transferring signals from the emitter follower 86 via capacitor 274 to transistor 276 of paraphase amplifier 90 which also comprises transistor 278.

Transistor 276 includes base 280 coupled to capacitor 274 and emitter 282 connected via resistor 284 to resistor 286 connected to emitter 288 of transistor 278, which also includes a base 290 and collector 292. The base 290 is connected to a terminal 294 between resistors 296 and 298. The base 280 of transistor 276 is connected to terminal 300 connected between resistor 302 and resistor 304.

The collector 306 of transistor 276 is connected via diode 308 and capacitor 310 to base 312 of transistor 314 also having collector 316 and emitter 318. The collector 292 of transistor 278 is connected via diode 320 and capacitor 322 to the base 324 of transistor 326. Transistors 314 and 326 have their emitters 318 and 328 connected in common via resistors 330 and 332 to line 334. The emitters 318 and 328 are also connected to opposite terminals 336 and 338 of potentiometer 102 whose tap 104 is connected to amplitude mixer 108.

From the above, it is seen that inverted and non-inverted signals (or positive or negative signals) are applied to opposite end terminals 336 and 338 of potentiometer 102 so that the tap 104 may adjustably select a level therebetween, which level is applied via line 106 to the amplitude mixer 108.

It will also be noted relative to paraphase amplifier 90 that terminal 294 is grounded via capacitor 340 and that resistors 284 and 286 are connected via resistor 342 to respective ends of resistors 304 and 298.

The amplitude mixer 108 consists of three parallel branches respectively comprising capacitor 344 and resistor 346 for the first branch, capacitor 348 and resistor 350 for the second branch and capacitor 352 and resistor 354 for the third branch. Capacitor 344 is coupled to the blanking circuit 26 via line 356 and the circuitry hereinbefore described. Capacitor 348 is coupled to line 106 and capacitor 352 is connected via line 50 to luminance circuit 26. The resistors 346, 350 and 354 are connected to common terminal 360 which is grounded through resistor 362 and connected to collector 364 of transistor 366 whose emitter 368 is grounded and whose base 370 is connected via capacitor 372 to ground and via tap 374 of potentiometer 376 to line 378. The audio circuit 12 is connected via line 44 to the base 370 of transistor 366 and thus controls at least in part the magnitude of signal which passes via line 110 to emitter follower 112.

More particularly, line 110 is coupled to the transistor 380 of emitter follower 112 via a parallel arrangement of diode 382 and capacitor 384, this arrangement making it possible to pass signals with a minimum size capacitor while accommodating the full range of signals which are transmitted from amplitude mixer 108 to the emitter follower 112.

The collector 386 of transistor 380 is connected to resistor 388, whereas the emitter 390 of transistor 380 is connected to resistors 392 and 394. Resistor 394 is connected to resistors 396 and 398, the latter resistor being connected to capacitor 400.

The resistor 396 is connected to the base 402 of transistor 404 whose emitter 406 is connected via line 408 to resistor 410. The collector 412 of transistor 404 is connected via resistor 414 to resistor 388 and also to line 416.

Clamp pulse circuit 34 is connected via line 38 to resistor 418 which is connected to base 420 of transistor 422 whose emitter 424 is connected to capacitor 426 and to tap 428 of potentiometer 430. The collector 432 of transistor 422 is connected via coil 434 to capacitor 436 connected in turn to line 408. The junction 438 between capacitor 436 and coil 434 is connected to resistor 440 connected in turn via resistor 442 to base 444 of transistor 446 whose emitter 448 is connected to emitter 450 of transistor 452.

The collector of transistor 446 is indicated at 454 and is connected via resistor 460 to line 416. The collector 462 is connected via line 464 and resistor 466 also to line 416.

Clamping pulses generated in circuit 34 pass via clamping circuit 416 to junction 470 between resistor 442 and capacitor 400. Junction 470 is the point at which output signals from the emitter follower 112 are clamped.

Buffer amplifier 114 comprises transistor 480 including base 482 connected via resistor 484 to line 464, whereas the emitter 486 is connected via line 488 to resistor 490 and resistor 492 connected in turn to resistor 494, as well as line 496. The collector 498 of transistor 480 is connected via resistor 500 to line 416.

Resistor 494 is connected to base 502 of transistor 504 whose emitter 506 is connected to resistor 494 and via capacitor 508 to output terminal 80 via line 124. Collector 510 of transistor 504 is connected via resistor 512 to line 416.

As has been indicated hereinbefore, the signal passing from amplifier mixer 108 passes through emitter follower 112 and thence to buffer 114 to output circuit 122 and thence via line 124 to output terminal 80. Clamp pulse circuit 34 generates clamp pulses feed to clamp circuit 116 which operates to clamp the output signal before it is transmitted to the output circuit.

In the mixing circuit, amplitude mixing is performed. As to the frequency of the signals being processed, the red video signal may have a frequency 7mH/cs, the luminance signal may have the same frequency and the blanking signal may typically have a frequency of 3mH/cs.

Manual control is afforded through the operation of slider or tap 428 of potentiometers 430, whereas additional controls are provided by potentiometers 62 and 102. The potentiometer 102 permits selecting a level as between the inverted and non-inverted signals applied to terminals 336 and 338. Potentiometer 62 permits controlling the signal supplied by blanking circuit 26. Further control is provided by slide 68 which is grounded.

Figure 5:
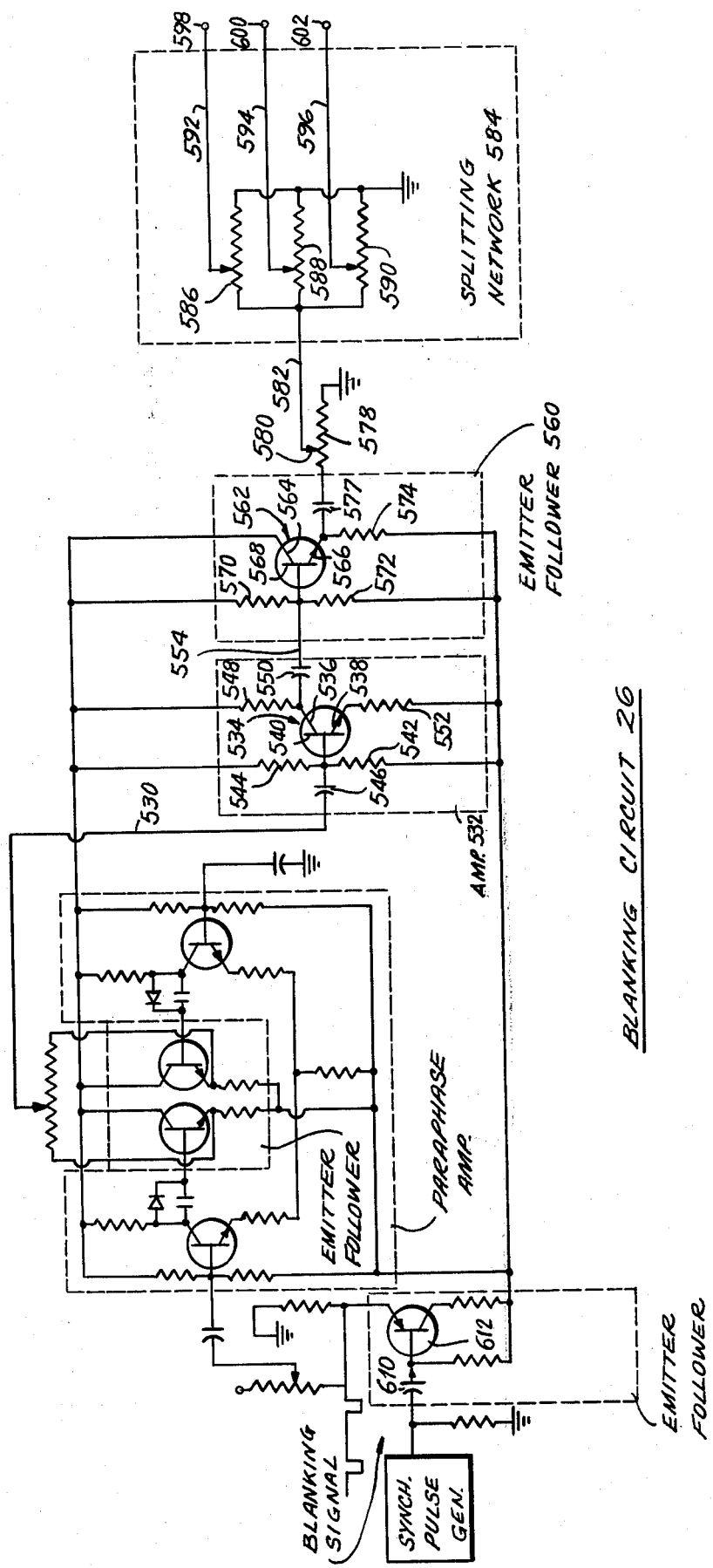
FIG. 5 is a schematic diagram of a blanking circuit utilized in the circuitry of FIG. 1.

Inasmuch as the details of the blanking circuit 26 illustrated in FIG. 5 follow generally the same arrangement in passing through an emitter follower, paraphase amplifier and emitter follower arrangement attached thereto and supplying a potentiometer, a detailed description of these aspects of the circuit is omitted. However, it should be noted that the potentiometer feeds its signal via line 530 to an amplifier 532 including transistor 534 with collector 536, emitter 538 and base 540, resistors 542 and 544, capacitor 546, resistor 548 and capacitor 550.

The base of transistor 534 is connected to the junction between resistors 542 and 544 as well as to capacitor 546. The collector is connected to resistor 548 and capacitor 550, whereas the emitter 538 is connected to a resistor 552.

The signal is transmitted via line 554 from capacitor 550 to emitter follower 560 including transistor 562 including collector 564, emitter 566 and base 568. Resistors 570 and 572 are connected to base 568 and resistor 574 is connected to emitter 576 which is also connected via capacitor 577 to potentiometer 578 having a tap or slide 580 affording manual control of the signal passed through by emitter follower 560.

The adjustment potentiometer 578 transmits a signal via line 582 into splitting network 584 having potentiometers 586, 588 and 590 connected via lines 592, 594 and 596 to output terminals 598, 600 and 602 which are respectively connected to lines 56, 58 and 60 as illustrated in FIG. 1.

Figure 6:
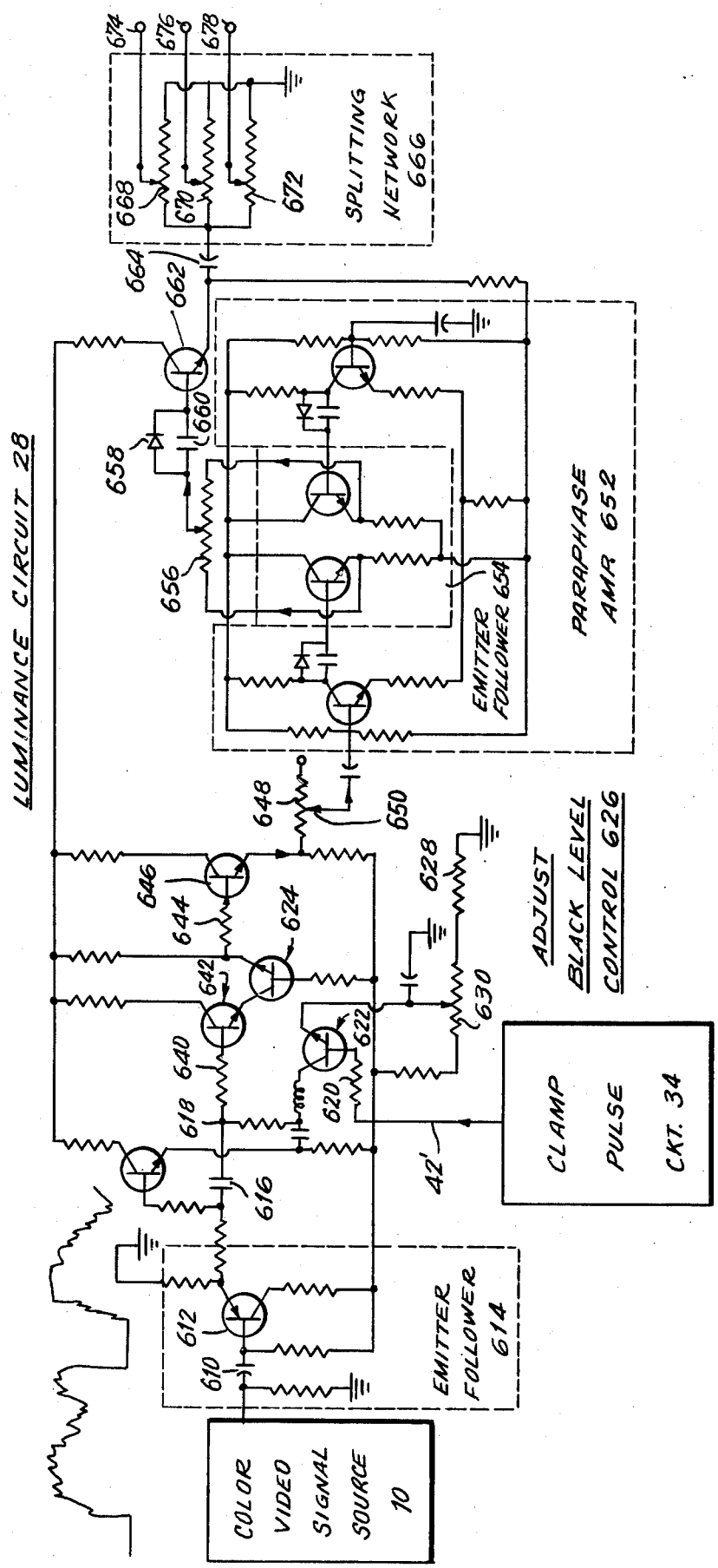
FIG. 6 is a schematic diagram of a luminance circuit employed in the circuitry of FIG. 1.

Finally, FIG. 6 illustrates the details of luminance circuit 28 previously discussed relative to FIG. 1, this luminance circuit operating in conjunction with color video signals source 10, and clamp pulse circuit 34. Its input is illustrated generally in the form of a non-composite video signal which is applied via capacitor 610 to transistor 612 of emitter follower 614, the construction and operation of which is generally the same as has been previously discussed. The signal passes from emitter follower 614 via capacitor 616 to junction 618 which is clamped by operation of clamp pulse circuit 34 feeding its input via line 42' and resistor 620 to transistor 622 coupled to the black level clamp transistor 624.

An adjust black level control circuit 626 is provided including resistor 628 and potentiometer 630 coupled to transistor 622. The operation of potentiometer 630 adjusts the black level and particularly the clamping level appearing at junction 618 which is connected via resistor 640 and transistor 642 to the aforesaid transistor 624. The adjusted and clamped black level signal passes via resistor 644 to transistor 646 and thence to potentiometer 648 whose tap 650 provides an operational control of the black level control signal. The signal passes to paraphase amplifier 652 whose construction is similar to those paraphase amplifiers described heretofore which operates in conjunction with emitter follower 654 to apply positive and negative signals across a potentiometer 656 so that a selected level signal can be transmitted by diode 658 in parallel with capacitor 660 to transistor 662. Thus, in a manner hereinbefore described, the signal fed into the paraphase amplifier 652 is converted into inverted and non-inverted signals the level between which is isolated by emitter follower 652 and selectively transmitted onwardly, in this case, via line 664 to splitting network 666 operating in the same manner as hereinbefore indicated for the prior splitting networks. To this end the splitting network 666 includes adjustment potentiometer 668, 670 and 672 supplying output signals to output terminals 674, 676 and 678 which are respectively connected to lines 50, 52 and 54 as illustrated in FIG. 1.

The video effects unit as described above is able to give continuous variable positive and negative video pictures which greatly increases the color range of the video pictures generated by providing a mixture of positive and negative colors. This readily enables re-matching video tape recordings and telecine channel film.

In addition to the black level control described previously, potentiometer 376 as illustrated in FIG. 4 and provided for each of the red, green and blue channels gives individual control of the black level of each of such channels. If, for example, a video tape recording is minus one channel, then luminance can be added to the minus channel until the face tones are approximately right.

Provision is made by the above circuit for day-for-night signal production and reducing or removing highlights. The luminous circuit can be clipped to a point such that only the sky or highlight information remains by using, for example, the clamp control afforded by potentiometer 630 in FIG. 6. By adjusting potentiometer 376 and potentiometer 430 as well as other controls in the color circuits, it is possible to add negative luminance such that sky and similar highlights are taken below black level. The red, green and blue channel clipping controls illustrated by way of example as potentiometer 62 in FIG. 4 can be adjusted to clip at black level. At this point, the sky can be inverted without affecting foreground information in the video picture. By adding negative blanking to the red, green and blue channels, it is possible to adjust the black level point of the foreground information in the video picture such that a very effective night scene is realized. During hours of daylight, alternatively varying the amount of luminance and red, green and blue luminance controls can produce a great range of sky effects.

When suitable audio signals are fed into the video effects unit such as a scream, whistle, musical note or the like, then any or all of the red, green or blue signals can be modulated by the audio signal so that, for example, a scream might cause a red lamp in the video picture to pulse on and off for a period responsive directly to the scream.

The circuit described hereinabove can convert negative stock into position stock and provide color balance as an on-line facility with respect to telecine productions. Existing positive stock can be color balanced on line.

As to video tape recording, color balance can be varied over a very wide range with saturation being increased or decreased. Black levels can be adjusted independently and luminance can be added or subtracted. Highlights can be varied continuously, all of this being accomplished "on line."

As to television studio use, a great range of new colors can be provided by the above circuits and scenes can go from normal positive pictures to fully negative pictures. A great range of color effects can be provided on line and with continuous variance. Studio cyclorama can be continuously varied without effecting foreground subjects with this being achieved on line.

As indicated above, night scenes can be achieved with the sky inverted and with the foreground remaining unchanged. A great range of sky effects can be achieved such as, for example, sunsets, storms, sunrises and so forth. Use can be made of normal daylight to light the foregound subjects while having a night sky and so forth, all of this being achieved "on line."

As has been noted hereinabove, audio signals can be used to modulate the video signal.

These will now be obvious to those skilled in the art many modifications and variations of the circuits set forth hereinabove. These modifications and variations will not depart from the scope of the invention if defined by the following claims.

What is claimed is:

1. A video effects apparatus for use with a source of red, green and blue video signals and of supplemental television signals, said apparatus comprising paraphase amplifier means for receiving at least one of said video signals and deriving positive and negative signals therefrom, potentiometer means coupled to said paraphase amplifier means and including separate terminals respectively receiving said positive and negative signals and a tap adjustable between said terminals, mixing means coupled to said tap to receive a tapped signal from said paraphase amplifier means, and further means deriving a further signal from at least one of said supplemental television signals and transmitting the thusly derived further signal to said mixing means, said mixing means amplitude mixing said tapped signal and further signal to generate a video effects color signal.

2. Apparatus as claimed in claim 1 comprising clamping pulse generating means for generating clamping pulses and clamping means responsive to said clamping pulses for clamping the video effects color signal.

3. Apparatus as claimed in claim 2 wherein said clamping pulse generating means comprises receiving means for receiving pulses from said source of supplemental signals, differentiating means for differentiating said pulses to form pulses of opposite polarities, and means to pass pulses of one of said polarities to constitute clamping pulses.

4. Apparatus as claimed in claim 3 wherein said source is a source of synchronization pulses.

5. Apparatus as claimed in claim 3, wherein said source is a source of composite video signals and said receiving means includes a clipper coupled to said differentiating means for clipping pulses from said composite video signals.

6. Apparatus as claimed in claim 2 comprising manual control means for controlling the clamping of the video effects color signal.

7. Apparatus as claimed in claim 1 further comprising a source of audio signals, and means to derive an audio control signal from said audio signals and apply the audio control signal to said mixing means, said mixing means further amplitude mixing the audio control signal with said tapped and further signals.

8. Apparatus as claimed in claim 7, wherein said means to derive an audio control signal comprises a transformer for receiving said audio signals, an audio amplifier coupled to said transformer to amplify audio signals received therefrom, and a splitting network for splitting the thusly amplified signal to produce three signals one of which is applied to said mixing means.

9. Apparatus as claimed in claim 1 comprising further potentiometer means which couples said further means to said mixing means and controllably adjusts said further signal.

10. Apparatus as claimed in claim 9, wherein said source of supplemental signals is a source of blanking or synch signals, said further means comprising an emitter follower for receiving the latter said signals, a paraphase amplifier coupled to the emitter follower for generating positive and negative signals, emitter follower means for transmitting said positive and negative signals, a potentiometer coupled across said emitter follower means and including a tap, an amplifier coupled to said tap for amplifying the thusly tapped signal and a splitting network for receiving the amplified signal and splitting the same into signals adapted to cooperate with said video signals and one of which is transmitted to said mixing means.

11. Apparatus as claimed in claim 10 comprising adjustment means between said amplifier and splitting network to adjust the magnitude of the signals passing therebetween.

12. Apparatus as claimed in claim 9 comprising a ground circuit adjustably coupled to said further potentiometer means.

13. Apparatus as claimed in claim 10, wherein the splitting network includes adjustment means to adjust each of the signals formed therein.

14. Apparatus as claimed in claim 1 comprising emitter follower means between said paraphase amplifier means and said potentiometer means to isolate the same.

15. Apparatus as claimed in claim 1 wherein said further means is a source of audio signals whereby the said at least one video signal is modified by a signal derived from the audio signals.

16. Apparatus as claimed in claim 1 comprising further paraphase amplifiers for the other two video signals, further potentiometers coupled to said further paraphase amplifiers and including separate terminals coupled to said paraphase amplifiers and taps adjustable therebetween, and further mixing means coupled to the latter said taps, the said further means which derives the said further signal from said one supplemental further signal applying the thusly derived signal to said further mixing means.

17. Apparatus as claimed in claim 1 comprising emitter follower means coupled to and receiving said video effects color signal and a buffer amplifier coupled to said emitter follower means to amplify the video effects color signal to constitute an output signal.

18. Apparatus as claimed in claim 17 comprising between said mixing means and the latter said emitter follower means a diode and capacitor in parallel for the transmission of signals.

19. Apparatus as claimed in claim 1, wherein said source of signals is a source of non-composite video signals, comprising means to receive the non-composite video signals, clamping means to clamp the same and produce a black level, means to adjust the black level and produce an adjusted black level control signal, a paraphase amplifier to produce positive and negative black level control signals, a potentiometer across which the latter said signals are applied, and a splitting network coupled to said potentiometer for splitting the black level control signals into separate signals for respectively cooperating with the video signals in said mixing means.

20. Apparatus as claimed in claim 19 comprising adjustment means to receive the adjusted black level control signal and transmit the same to said paraphase amplifier.

21. Apparatus as claimed in claim 20 comprising an emitter follower between said paraphase amplifier and the latter said potentiometer.

22. A method for providing special video effects by the use of color video signals and supplemental television signals, said method comprising forming at least one of said video signals into inverted and non-inverted signals, selecting a signal level between the inverted and non-inverted signals, and amplitude mixing the thusly selected signal with a further signal derived from at least one of said supplemental signals to produce an output signal.

23. A method as claimed in claim 22, wherein the said further signal is derived from an audio signal which constitutes one of the supplemental television signals.

24. A method as claimed in claim 22, wherein the said further signal is derived from a blanking signal.

25. A method as claimed in claim 22, wherein the said further signal is derived from a non-composite video signal.

26. A method as claimed in claim 22 wherein the output signal is clamped with a signal derived from a synch or composite video signal.

27. A method as claimed in claim 22 comprising adjusting said signal level for color balance.

28. A method as claimed in claim 22 comprising adjusting said signal level to achieve special effects.

29. A method as claimed in claim 22 comprising adjusting said signal level to convert negative stock effects to positive stock effects.

* * * * *